(12) United States Patent
Nieminen et al.

(10) Patent No.: US 10,486,049 B2
(45) Date of Patent: Nov. 26, 2019

(54) DEVICE AND METHOD FOR MONITORING SWIMMING PERFORMANCE

(71) Applicant: Amer Sports Digital Services Oy, Vantaa (FI)

(72) Inventors: Heikki Nieminen, Vantaa (FI); Markus Kemetter, Helsinki (FI); Janne Kallio, Vantaa (FI); Antti Virtanen, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 502 days.

(21) Appl. No.: 13/833,755

(22) Filed: Mar. 15, 2013

(65) Prior Publication Data

US 2014/0277628 A1 Sep. 18, 2014

(51) Int. Cl.
  *A63B 71/06* (2006.01)
  *G06K 9/00* (2006.01)
(52) U.S. Cl.
  CPC .......... *A63B 71/06* (2013.01); *G06K 9/00342* (2013.01)
(58) Field of Classification Search
  CPC ............... A63B 71/06; G06K 9/00342; G06K 9/00335; G01C 22/00
  USPC .................................. 700/91; 463/20, 25, 30
  See application file for complete search history.

(56) References Cited

U.S. PATENT DOCUMENTS

| | | | |
|---|---|---|---|
| 6,955,542 B2 | 10/2005 | Roncalez et al. | |
| 7,980,998 B2 | 7/2011 | Shemesh et al. | |
| 2004/0020856 A1* | 2/2004 | Wong et al. | 210/656 |
| 2008/0018532 A1* | 1/2008 | Mackintosh | A63B 24/0021 342/357.57 |
| 2009/0048044 A1* | 2/2009 | Oleson | A63B 24/0062 473/570 |
| 2010/0009760 A1* | 1/2010 | Shimamura | A63F 13/428 463/43 |

(Continued)

FOREIGN PATENT DOCUMENTS

| EP | 1870139 A1 | 12/2007 |
|---|---|---|
| EP | 1992389 A1 | 11/2008 |

(Continued)

OTHER PUBLICATIONS

Siirtola et al. Efficient accelerometer-based swimming exercise tracking. Nov. 4, 2011, p. 156-161.

*Primary Examiner* — Jay Trent Liddle
*Assistant Examiner* — Alex F. R. P. Rada, II
(74) *Attorney, Agent, or Firm* — Seppo Laine Oy

(57) ABSTRACT

The invention relates to a device and method for monitoring a swimming performance. The device comprises one or more motion-sensitive sensors for providing motion data characteristic to the motion of the swimmer during said swimming performance and a computing unit adapted to detect body motions from said motion data using predefined criteria. According to the invention the computing unit comprises means for calculating a plurality of correlation factors depicting correlation of motion data between successive body motions detected, means for storing the correlation factors as a time series, and means for determining one or more parameters characteristic to the swimming performance based on said correlation factors stored. The invention can be used for robust determination of swimmer's turns, distance swum or swimming style, for example.

23 Claims, 10 Drawing Sheets

(56) References Cited

U.S. PATENT DOCUMENTS

| | | | |
|---|---|---|---|
| 2010/0210975 A1* | 8/2010 | Anthony, III | A61B 5/0002 600/595 |
| 2011/0288381 A1* | 11/2011 | Bartholomew et al. | 600/301 |
| 2012/0015779 A1* | 1/2012 | Powch et al. | 482/9 |
| 2012/0019381 A1* | 1/2012 | Yuen | A63B 71/0686 340/539.26 |
| 2012/0072165 A1 | 3/2012 | Jallon | |
| 2012/0231840 A1* | 9/2012 | Calman | G06K 9/00342 455/556.1 |
| 2012/0283856 A1* | 11/2012 | Caritu et al. | 700/91 |

FOREIGN PATENT DOCUMENTS

| | | |
|---|---|---|
| EP | 2128724 A2 | 3/2010 |
| GB | 2465824 A | 6/2010 |
| WO | WO 03061779 A1 | 7/2003 |
| WO | WO 2010083562 A1 | 7/2010 |
| WO | WO 2010090867 A2 | 8/2010 |
| WO | WO2010113135 A1 | 10/2010 |
| WO | WO 2011150451 A1 | 12/2011 |

\* cited by examiner

DEVICE AND METHOD FOR MONITORING SWIMMING PERFORMANCE

FIELD OF THE INVENTION

The invention relates to monitoring swimming. In particular, the invention relates to calculation of distance swum and other parameters characteristic to a swimming performance based on motion-sensor data.

BACKGROUND OF THE INVENTION

Wearable sports monitors are used by many amateur and professional sportsmen and sportswomen for collecting data on and for analyzing sports performances to assist training. For example, automatic tracking of distance travelled has become common in outdoor sports due to satellite-positioning receivers. Swimming forms a particular challenge in this respect, because it is usually carried out indoors, where satellite positioning does not work. Swimming distance can, however, be determined using for example acceleration sensor, predefined information on the pool length and recognition of the swimmer's turns at the ends of the pool.

Another challenge in swimming monitoring is the characterization of swimming style, i.e., whether front crawl, breast stroke, butterfly stroke, back crawl or one of the other possible swimming styles, is used. This is a difficult task because not only the styles are quite similar as concern the strokes of the swimmer from the viewpoint of "blind" accelerometers, but because there is great personal stroke variation between swimmers. There are no robust and computationally light methods available that would reliably determine the swimming style based on measuring the properties of strokes.

US 2004/0020856 discloses a swimming monitor comprising an acceleration-based stroke sensing circuit and magnetic field-based lap sensing circuit. The lap sensing circuit is adapted to detect 180 degrees changes in magnetic bearings in order to detect the end points of the pool. The device does not allow for swimming style classification. U.S. Pat. No. 6,955,542 discloses a system for monitoring repetitive movement such as swimming strokes using a two-dimensional accelerometer sensor preferably mounts on the swimmer's back. The system may also identify strokes, movement patterns and start or stop times of movements and provide feedback for the user in real time.

U.S. Pat. No. 7,980,998 discloses a training support device comprising a sensing unit adapted to repeatedly measure movement of a body part of a swimmer using an accelerometer, compass and optimally a gyroscope. The device is configured to determine the exact location and orientation of the body part in order to help to improve movements. The device may also determine the periodicity of movements and statistical information on the performance.

US 2010/0210975 discloses a swimming performance monitoring system utilizing a three-dimensional accelerometer. The system comprises stroke recognizer that is able to analyze accelerometer data for detecting strokes and finding turns and swimming style. The stroke recognizer applies rules directly on filtered accelerometer data. However, the success of this approach, in particular in style classification, depends heavily on how well the personal stroke of the swimmer matches with the predefined rules.

The systems according to the known art are either not capable of determining swimming styles and/or turns of swimmers, or their capability to detect these or other swimming-related parameters depends heavily on the personal properties of the swimmer.

Thus, there is a need for improved devices and methods for assisting automating determination of swimming parameters.

SUMMARY OF THE INVENTION

It is an aim of the invention to provide an improved device and method for determining swimming performance parameters. A particular aim is to provide a device and method using which the total distance swum in a swimming pool, or the swimming style can be more reliably measured and detected.

A secondary aim is to provide a novel sensor fusion approach for characterizing swimming, and in particular to provide novel uses for magnetometer and accelerometer sensors in a swimming monitor device.

The invention is based on the idea of measuring movement of the swimmer using motion-sensitive sensors and extracting from the measured motion data correlation information depicting the similarity of successive body motions. The correlation data can thereafter be used for calculating various parameters regarding the swimming performance, such as turns of the swimmer at the ends of a swimming pool, distance swum, and even the swimming style.

Temporal variations and spatial statistical distribution of correlation are in particular robust indicators of several swim-related parameters. Independent of the swimmer's personal properties or habits, high correlation between successive body motions is a robust indicative of normal swimming, i.e. forward-conveying swimming movements, whereas low correlation is indicative of turns at the ends of the pool or pauses, i.e. resting periods, in the swimming performance. On the other hand, three-dimensional measurements of the body motions using an accelerometer, combined with correlation calculation in each of the three dimensions can be used for reliable characterization of the swimming style.

More specifically, the invention is characterized by what is stated in the independent claims.

The invention provides significant advantages. The motion correlation analysis used helps to achieve a method, which is relatively independent on the individual swimming style of the swimmer. Both the swimmers turns and the swimming style used in training can be determined with good accuracy without a priori knowledge on the swimmer's personal way of swimming, as will be demonstrated later in this document. The separation of repetitive motion detection and movement correlation analysis is one of the key features of the invention and allows for utilizing data provided by two or more different sensor types in a very robust way. On the other hand, it is also an advantage of the invention that good results can be obtained using only one sensor type.

Correlation-based determination is also immune to slow drifts in swimming speed, for example, because the correlation is determined between two successive motions. The invention can be used for characterizing swimming performances of various kinds, including for example uninterrupted training sessions and interval training sessions. Interval training needs not be a priori planned or input to the device, but may be completely dynamic, because that the correlation-based monitoring algorithm is capable of robustly determining both turns and resting periods during the session "on the fly". Thus, resting periods may be registered and total or inter-lap resting time can be calculated and visualized to the user to assist training.

Preferable embodiments are the subject of the dependent claims.

According to one embodiment, there is provided a device attachable to a body part, such as wrist, of a swimmer for monitoring a swimming performance. The device comprises one or more motion-sensitive sensors for providing motion data characteristic to the motion of the swimmer during said swimming performance. The motion-sensitive sensor(s) is/are functionally connected to a computing unit adapted to detect body motions, such as hand strokes, from said motion data using predefined criteria, for example, high or low peaks, i.e. derivative null points, of the data. According to the invention, there are also provided in the computing unit means for calculating and at least temporarily storing a time series of correlation factors depicting correlation of motion data between successive body motions detected and means for determining one or more parameters characteristic to the swimming performance based on said correlation factors stored.

The method according to one embodiment of the invention comprises measuring movement of a swimmer using one or more motion-sensitive sensors attached to a body part of the swimmer for providing motion data, and analyzing said motion data for detecting body motions of the swimmer. The method proceeds by determining correlation of motion between successive body motions detected continuously during the swimming performance, and determining at least one swimming performance parameter based on said correlation of motion.

According to one aspect of the invention, the device comprises a first motion-sensitive sensor, and a second motion-sensitive sensor of different type than the first motion-sensitive sensor, and the computing unit is adapted to use motion data provided by the first sensor for detecting the body motions and motion data provided by the second sensor for calculating the correlation factors.

The one or more motion-sensitive sensors preferably comprise an accelerometer and/or a magnetometer, both of which provide output, which depend on the movement of the sensors by the swimmer during the performance due to acceleration of the sensor or orientation of the sensor in an external magnetic field.

According to one preferred embodiment, the body motions are detected using data provided by a magnetometer. An advantage of this embodiment is that it has proven that detection of individual hand strokes, for example, has proven to be more reliable than using acceleration data using presently available three-dimensional sensors. However, it is not excluded that acceleration data could be used for body motion detection instead or in addition to magnetometric data.

According to one preferred embodiment, the correlation factors are calculated at least using motion data provided by an accelerometer. An advantage of this embodiment is that the coordinate system of an accelerometer is fixed in relation to the swimmer, whereas a megnetometric data depends on the direction of swimming in relation to the magnetic field of the Earth. Although the swimmers turns can be detected even if the coordinate system is not fixed, characterization of swimming style is more straightforward in a fixed coordinate system.

At least for characterization of the swimming style, a three-dimensional sensor and three-dimensional correlation analysis is preferably used. Three-dimensional measurement and analysis also improves the robustness of body motion detection and turn detection.

The device preferably comprises means allowing for the user to enter at least the length of the swimming pool for the computing unit to be able to calculate total distance swum.

Alternatively or in addition to this, there may be in particular for outdoor use a satellite-positioning sensor provided in or connectable with the device.

As briefly referred to above, one important embodiment of the invention concerns the detection of turns of the swimmer in a swimming pool. Thus can be achieved based on temporal variations in the correlation factors in said time series. In one specific embodiment, regions of high and low correlation are distinguished by mathematical analysis and the regions of low correlation are flagged to represent turns if the time elapsed from a previous turn exceeds a predefined value (e.g. a world record at the particular pool length).

In more detail, the means for determining the temporal points of the swimmer's turns may be adapted to analyze the time series of correlation factors so as to find its local minima, and store the time points of the local minima as temporal points of the swimmer's turns provided that predefined criteria regarding the minima are fulfilled. On the other hand, if only a turn counter is implemented instead of a lap time register, it is not necessary to store the time points, but only to increase a turn counter.

Using similar logic, the means for determining one or more parameters may be additionally adapted to determine the temporal points of the start and/or end of the swimming performance based on regions of temporal variations in the correlation factors in said time series. For example, a start/end of the performance can be estimated to occur 0-5 seconds before/after regular body movements, i.e. high body motion correlation starts/ends (due to start/end "slides" of the swimmer).

As also briefly mentioned above, the device may be adapted to determine the swimming style used in said swimming performance utilizing multi-dimensional movement measurement. The style may be determined by first determining regions of high overall correlation in the time series of correlation factors. These regions represent the normal swimming periods between the pool ends. Then, dimension-specific correlation factors are determined during said regions. The values of the dimension-specific correlation factors are used to classify the swimming style to one of a plurality of predefined swimming style classes.

Preferably, the dimension-specific correlation factors are statistically formed, for example, average correlation factors over said regions of high overall correlation.

According to one embodiment, the device comprises a swimming style teaching mode in which it is adapted to measure and store correlation data during swimming and to allow user to assign a particular swimming style to that data. This is to allow the device to compare correlation data during real training with stored correlation data in order to distinguish between swimming styles of the swimmer better than using predefined regions in the movement space.

According to one aspect of the invention, which may be prosecuted in a divisional application, there is provided a device attachable to a body part of a swimmer for monitoring a swimming performance, the device comprising a motion-sensitive sensor for providing motion data characteristic to the motion of the swimmer during said swimming performance, a computing unit adapted to detect strokes of the swimmer from said motion data, and wherein the motion-sensitive sensor comprises a magnetometer, preferably a three-dimensional magnetometer. Previously, only accelerometric sensors have been used for stroke detection but the inventors have found that magnetometric data is surprisingly more reliable for this purpose.

Various embodiments and advantages of the invention will be more specifically discussed in the following detailed description with reference to the attached drawings.

DETAILED DESCRIPTION OF EMBODIMENTS

The term "body motion" refers to movements of body distinguishable using a motion-sensitive sensor during the performance. A device adapted to detect body motions using motion data is able to distinguish a specific type of body motion from at least some other types of body motions by mathematical analysis of the motion data. To mention one more or less artificial example only, the body motion detected may be e.g. "longitudinal acceleration of hand", mathematically corresponding to "acceleration value in Z-direction higher than a predefined value $a_z$".

As concerns the present method, a beneficial body motion and its detection algorithm is such that during swimming periods, there is high correlation of at least some motion data between the cyclic body motions, but during turning periods, the same body motion occurs more randomly or at least does not repeat in the same way as during swimming periods. It is worth mentioning that it is not necessary to know exactly which kind of movement or part of stroke is detected, as long as these criteria are fulfilled.

The term "correlation factor" refers to any value determined from the motion data being proportional to the similarity of body motions between which the correlation is determined.

The term "correlation vector" means a set of correlation factors determined in different dimensions of the motion data.

"Total correlation factor" is a correlation factor calculated by summing dimension-specific correlation factors.

A "time series" of (total) correlation factors is a data set which preserves the absolute or relative values of the (total) correlation factors and their relative order, preferably also their absolute or relative time of occurrence (corresponding typically to a detected stroke or another movement).

"Swimming period" refers to a period during which s swimmer preforms a series of similar repeating movements with the aim to move himself/herself forward.

"Turning period" refers to a short period between two successive swimming periods, in which the swimmer reverses his/her swimming direction in a swimming pool.

"Resting period" refers to a period of no swimming during a performance. Resting periods are common in interval-type training. "Resting time" is the time spent on one or more resting periods.

"Dynamic monitoring" refers to monitoring which is capable of distinguishing between swimming periods, turning periods and resting periods using only the measurement data from the sensors and a suitable algorithm. Dynamic monitoring is possible with a correlation-based algorithm according to the present invention.

Figure 1:
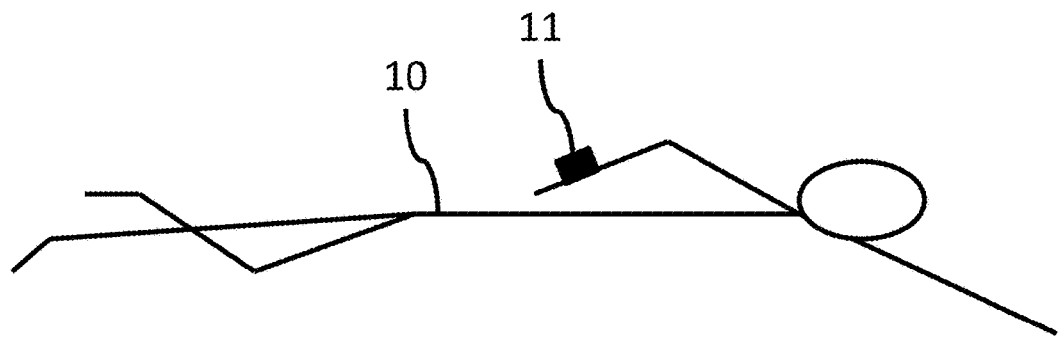
FIG. 1 illustrates a swimmer equipped with a wristop training device.

Referring first to FIG. 1, the following description concentrates on an implementation of the invention, where the device comprises a training device 11 attachable to the wrist on one hand of a swimmer 10. Wrist is beneficial because it moves along a wide path and experiences high acceleration during swimming. It is however not excluded that the device 11 would be attached to some other body part, such as a leg, back or head of the swimmer 10.

Figure 2:
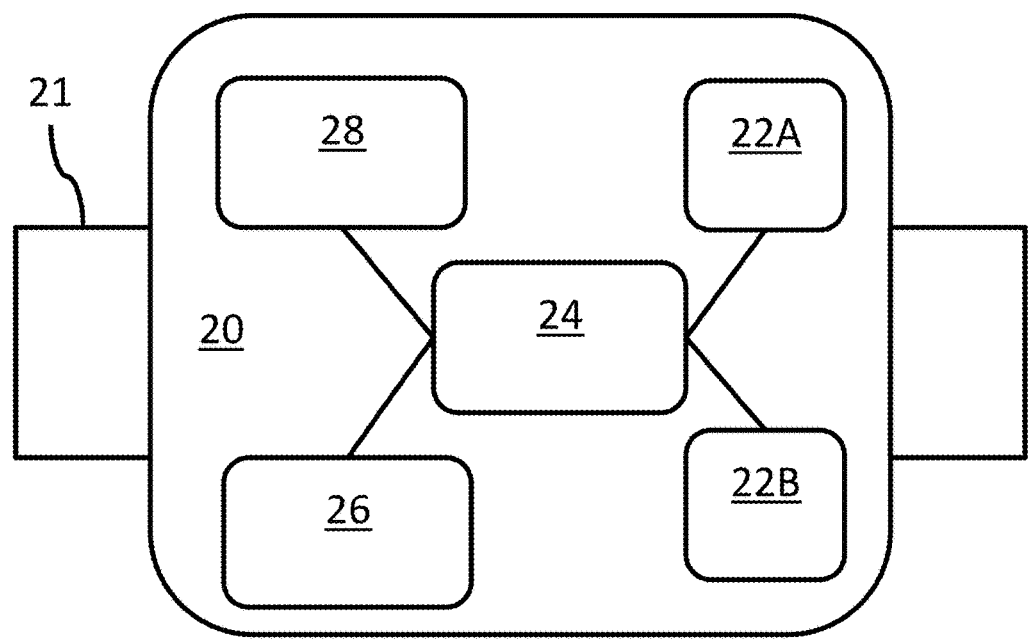
FIG. 2 shows a block diagram of a device according to one embodiment of the invention.

FIG. 2 shows components of the device 11 according to one embodiment. It comprises a main unit 20 and a strap 21 for attaching the device to wrist. The main unit 20 comprises a magnetometer 22A and an accelerometer 22B connected to a computing unit 24 capable of processing the data provided by the magnetometer 22A and the accelerometer 22B. In addition, there is provided a memory unit 26 for at least temporal storage of raw or processed measurement data. Moreover, there is provided a user interface means 28 comprising a display for visualizing the parameter(s) determined by means of the invention and/or user input means for controlling different functions of the device. Additional components (not shown) that may be present in the device include for example a wired or wireless communication unit and a satellite positioning unit.

Figure 3:
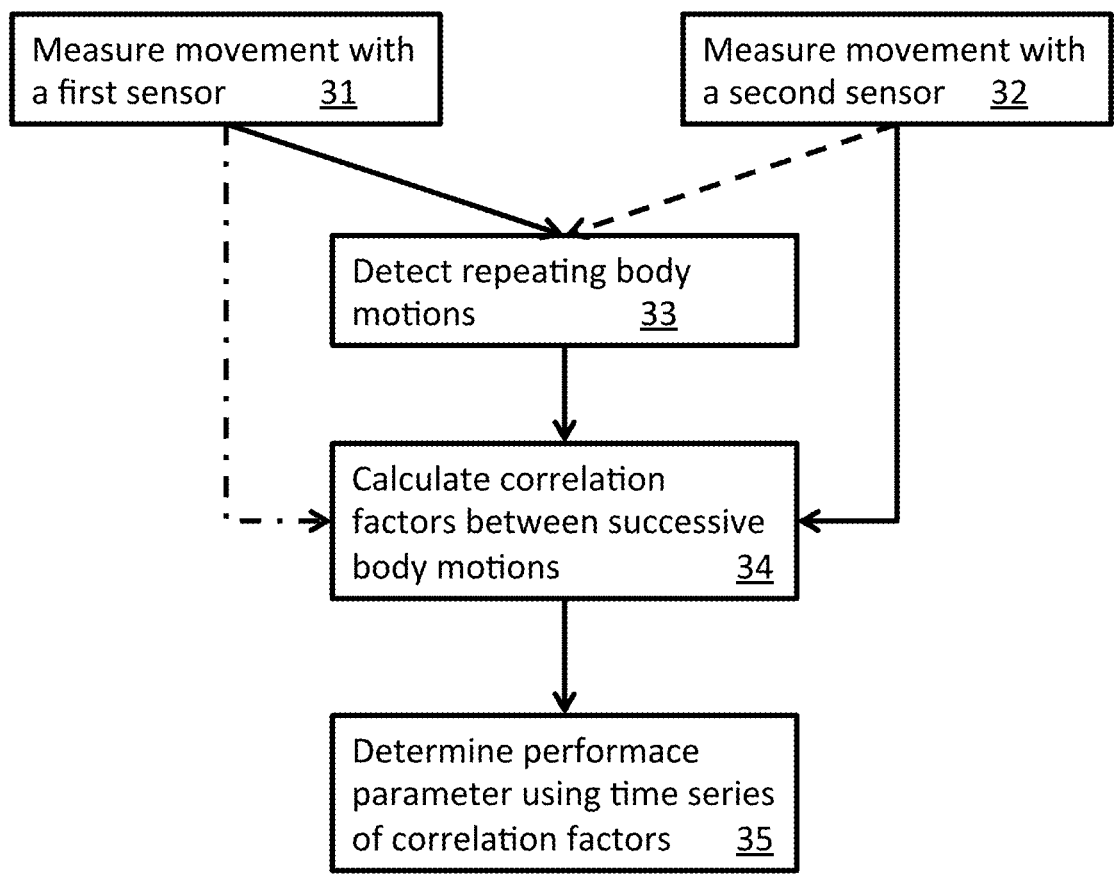
FIG. 3 shows a flow chart of the method according of the invention in a general level.

FIG. 3 illustrates the basic steps of the present method according to one embodiment. First, movement of the swimmer is measured with a first sensor, say the magnetometer 22A, in step 31. The data may comprise magnetic field strength in three dimensions as a function of time. Then, raw data is typically filtered in the computing unit 24 to provide filtered data (not shown) before further processing. Next, the filtered data is analyzed so as to find repeating motions, i.e. strokes, in step 33. This may be done for example by calculating a derivative of the data and finding its zeroes so as to locate local maximum and minimum magnetic field strengths.

It should be noted that it is not relevant for the present invention which points of the physical movement these maxima and/or minima correspond, since it is only essential to find the repetitive body motions. The time points of the maxima and/or minima, potentially after further evaluation of their relevance, are saved or flagged as stroke points (irrespective of which points of the strokes they represent and whether they are real strokes or "false strokes" during e.g. turns of the swimmer).

In the next step 34, the stroke points are utilized to find correlation between successive motions. It should be noted that the correlation in step 34 needs not be calculated based on the same sensor data than the body motion detection in step 33, but different data from measured by a second sensor in step 32 simultaneously with step 31, can be used. Only the stroke points are based on the first sensor data through step 33. The second sensor may be an acceleration sensor, for example. This embodiment is beneficial if the sensors are such that one provides data for distinguishing between repetitive motions more reliably and the other data better for correlation calculation. However, as shown in FIG. 3 with a dashed arrow, the correlation calculation may be based on the same data, too.

Correlation can be calculated in various ways. According to one embodiment, a correlation factor is calculated for each body motion detected such that data values at predefined points of the body motion are multiplied with data values at corresponding points of a previous detected body motion. The multiplication results can then be summed to obtain a correlation factor depicting correlation between the two body motions. The correlation factors are then preferably saved as a time series for use in the next step(s). The time series may comprise the correlation factors as a function of stroke count or as a function of time. In step 35, the time series of correlation factors is analyzed to determine one or more parameters depicting the swimming performance, most notably the temporal points or number of swimmers turns at the ends of a swimming pool, or the number or duration of the swimming periods (laps) and/or turning periods, or the total distance swum.

According to one embodiment, the swimming performance parameter comprises the temporal points or number of swimmer's turns at the ends of a swimming pool being determined based on temporal variations in the correlation of motion. This is possible because during the swimming periods the correlation factors are high (real similar strokes periodically one after another) and during the turning periods low (no similar strokes, but only potential "false strokes" detected with no periodicity due to turn-related body movements).

According to one embodiment, the method comprises determining local minima of the correlation time series, and storing the temporal points of the local minima as temporal points of the swimmer's turns provided that predefined criteria are fulfilled. The predefined criteria may include e.g. checking that the time elapsed from the last turn is not less than the world record at a corresponding lap length and/or that the lap durations remain predefined limits compared with each other.

Alternatively, a threshold level is determined such that correlation values above the threshold level are interpreted as originating from swimming periods and those below the threshold level as originating from turning periods. Additional criteria may used in this embodiment, too.

According to one embodiment, the swimming performance parameter comprises the swimming style of the swimming performance. The style may be determined by measuring movement of the body part of the swimmer in three dimensions to provide three-dimensional motion data, determining the abovementioned correlation factors separately in the three dimensions during the swimming performance defining three-dimensional correlation vectors, and determining the swimming style based on direction and magnitude of the correlation vectors of motion in the three dimensions (i.e. spatial location of the dimension-specific correlation factors). For style determination, only the data during the swimming periods (not turning periods) is used. To obtain more statistical robustness, the individual correlation factors over one or more swimming periods may be summed or averaged. It has been found out by the inventors that different swimming styles result is significantly different correlation vectors which allow reliable classification of the style. The swimmer's personal variation in style does not significantly affect the classification.

Figure 4:
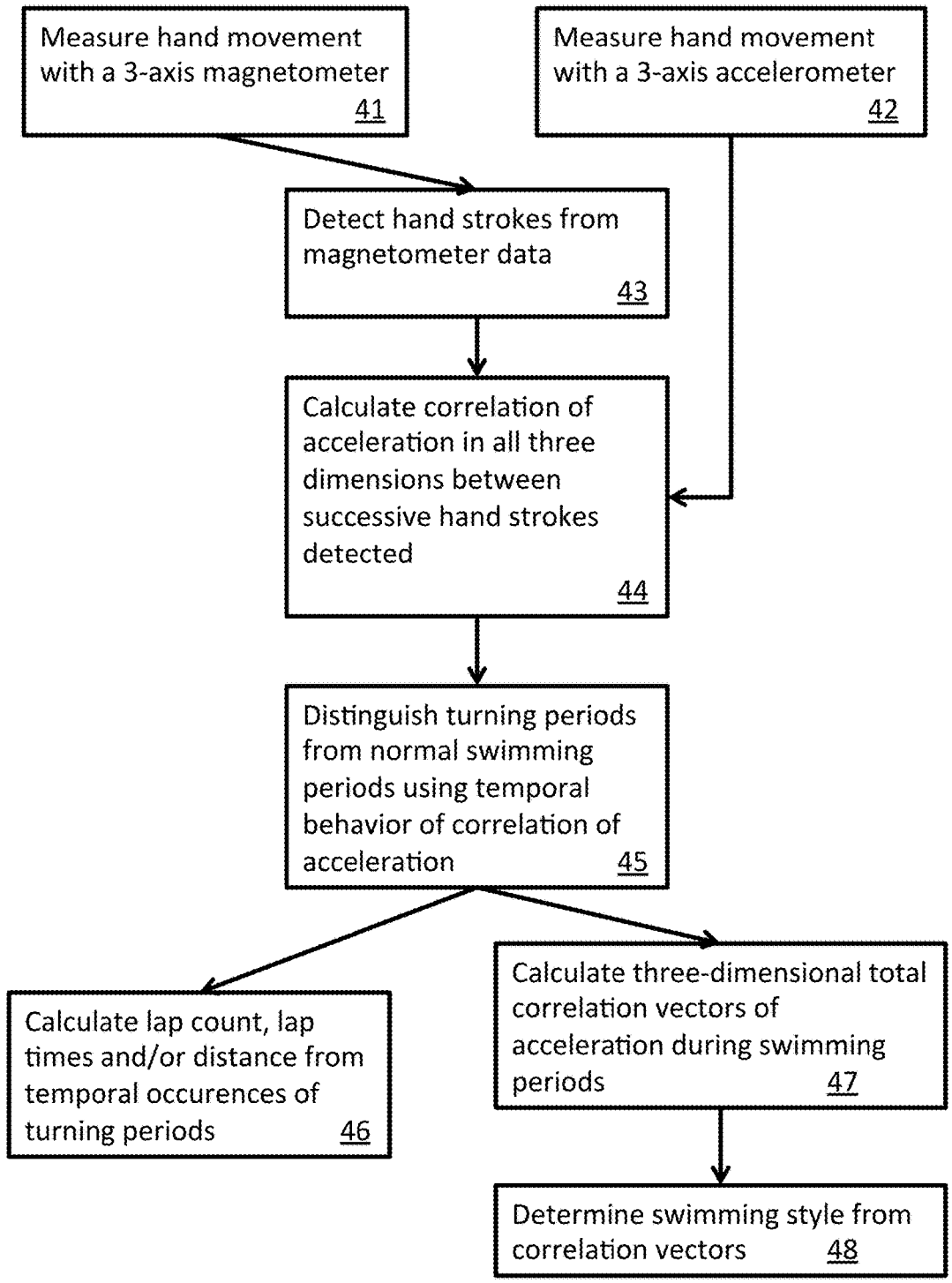
FIG. 4 shows a flow chart of a more detailed implementation of the method according to the invention.

FIG. 4 shows a more detailed implementation of a preferred embodiment of the invention as a flow chart. In step 41, a 3-dimensional magnetometer attached to a hand of a swimmer is used to provide magnetometric data corresponding to hand movement in the Earth's magnetic field. At the same time, accelerometric data corresponding to acceleration of the hand is measured using a 3-dimensional accelerometer in step 42. Both the magnetometric data and the accelerometric data are filtered and stored in temporary memory accessible by a computing unit. The magnetometric data is analyzed in the computing unit in step 43 to detect hand strokes. The stroke positions are further used in step 44 to calculate a series of correlation factors based on accelerometric data as described above in more detail (preferably separately for each of the three dimensions of acceleration in order to facilitate swimming style determination in steps 47 and 48). Turning periods are distinguished from swimming periods using the series of correlation factors in step 45 for example as described above.

After finding out the turning periods, the method may continue to determination of various parameters. The potentially most important parameters are stroke count, lap count, lap times, SWOLF (the sum of stroke count and time (in seconds) used for a pool length), total distance swum and/or average speed (step 46), or the swimming style (steps 47 and 48). Also resting time may be determined.

In should be noted that the term "stroke count" means herein the number of either stroke pairs or individual strokes and can be displayed for the used as either of these. When using asymmetric style, i.e., free stroke or back stroke, and if stroke count expressed as individual strokes, the strokes detected must be multiplied by two to get the number of individual strokes. Otherwise stroke pair count, i.e., cycle count, is actually obtained. When using symmetric styles, i.e. breast stroke or butterfly stroke, the cycle count and stroke count are naturally equal.

When calculating SWOLF, the individual stroke count is typically used. SWOLF is most often used for monitoring personal development as a swimmer.

Lap count can be determined by simply finding the number of turning periods. Lap times are obtained by calculating the time elapsed between two successive turning periods.

Distance is obtained by multiplying the lap count by a predefined lap length. Average speed is obtained by dividing the total distance by total time elapsed from the start of the swimming (which may be determined from the correlation data, too).

Instead or in addition to total parameters, the device may be adapted to determine interval parameters. There may be a separate interval training mode or the device may continuously detect these parameters based on the correlation data. Interval parameters include interval stroke count, interval count, interval distance, interval time, interval SWOLF, interval speed and/or interval swimming style. Also total resting time between intervals can be determined.

The intervals may be static, i.e. of predefined distance or time, or even more preferably, dynamic. Dynamic interval means one or more pool lengths without stoppage between them (i.e. an ordinary turn without rest in made between pool lengths and determined by the present device). For example, a swimmer may swim two pool lengths with medium pace, rest for 5 seconds, one pool length with high pace, rest for 15 seconds, two pool lengths with medium pace, rest for 5 seconds, and so on. Using dynamic monitoring, all these periods of different lengths and turns within each interval are detected by the present device without preliminary information on the course of the training or intervention of the user at the start/end of each interval.

Dynamic monitoring is possible because of the robust correlation analysis as described herein. Resting periods can be distinguished from ordinary turns for example by detecting prolonged periods of low correlation (e.g., low correlation for more than predefined time indicates that the swimmer is resting and less than predefined time indicates an ordinary turn). Using this approach, resting time is obtained with good precision essentially real-time during the resting periods. Compared with known resting time determination methods not based on correlation, the present method is more robust. For example, movement of the device while the user watches its visual interface during resting does not fool the device to think that the resting period is over. Such movement does not correlate with other movements detected and therefore the correlation factor remains small.

The swimming style determination involves more calculations. First, in step 47, the correlation factors for each of the three axes (X, Y, Z) of acceleration are summed or averaged over a plurality of strokes, typically over one or more swimming periods to obtain three total correlation factors forming a correlation vector in three-dimensional space. This step may also be carried out for each of the swimming periods separately in order to detect style changes between laps. The value of the correlation vector reveals the swimming style, when compared with predefined style-representing points or sections in the three-dimensional space. For example, style classification can be made by comparing the correlation vector, i.e., dimension-specific correlation factors with predefined threshold values in three dimensions or by finding a closest predefined correlation vector for the correlation vector determined.

Some of the embodiments described above are now illustrated with the aid of graphs shown in FIGS. 5-10. Apart from the graph of FIG. 7, these graphs are based on real filtered magnetometer and accelerometer data and the computing methods described above.

Figure 5:
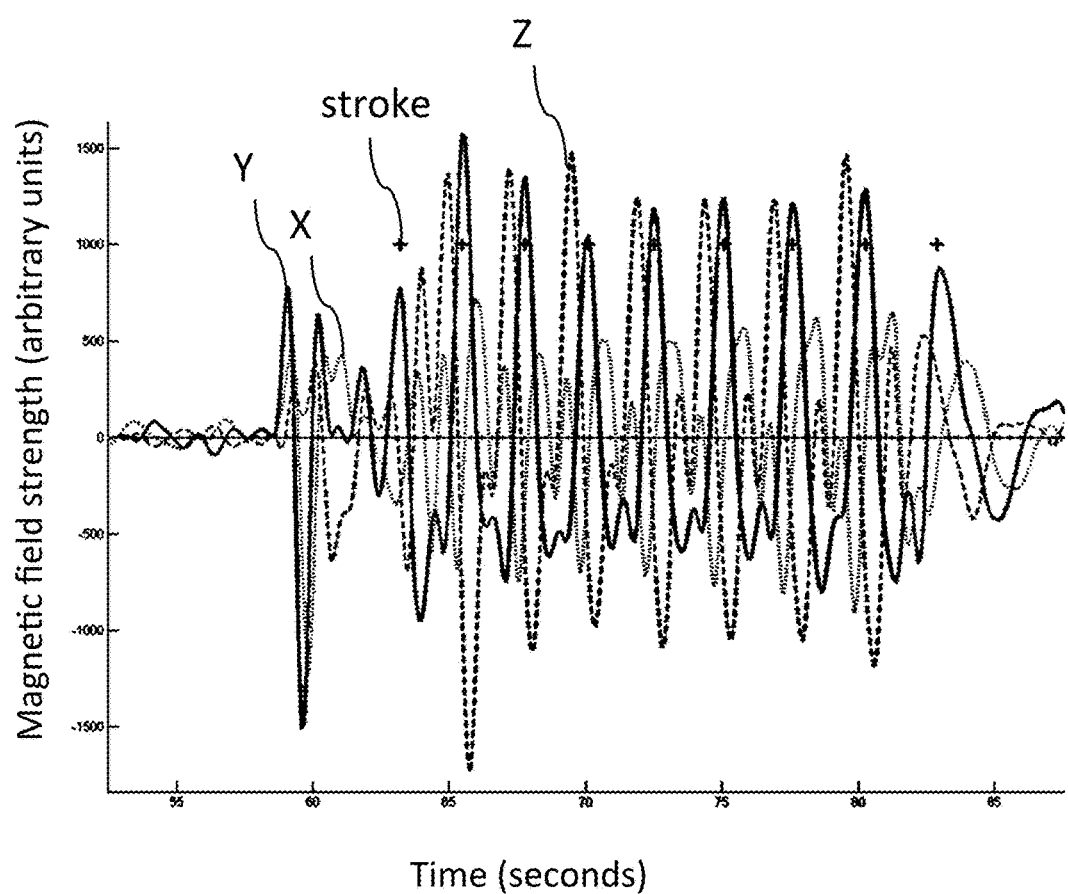
FIGS. 5 and 6 show example graphs of measured and filtered magnetometer data in three dimensions vs. time and illustrating stroke detection. Crosses mark accepted strokes.

FIG. 5 shows a magnetic field strength vs. time graph measured using a three-dimensional magnetometer (field in each dimension shows as an individual curve) comprising turning periods and one swimming period between the turning periods. As can be seen, during the swimming period, there are clearly distinguishable magnetic field peaks, the distinguishability depending on the dimension. Strokes detected from the magnetic data using a suitable stroke-detection algorithm are marked with "+" sign. During the turning periods, more random magnetic field data is observed.

Figure 6:
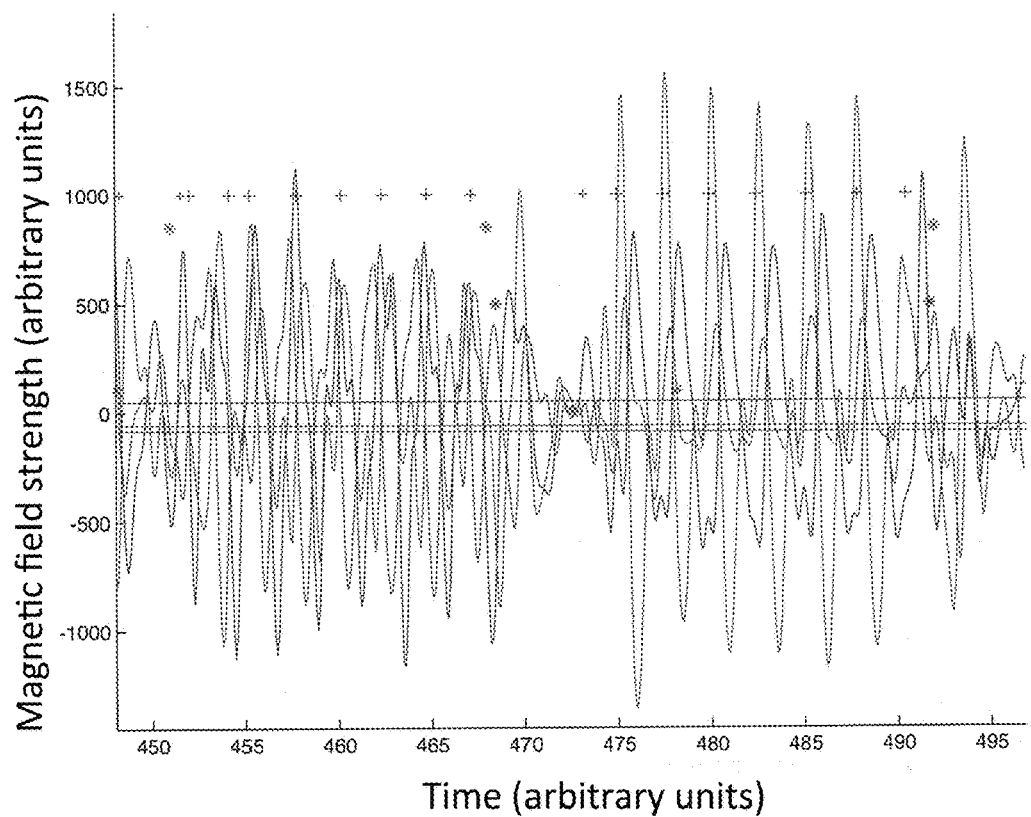

FIG. 6 illustrates the same things as FIG. 5 but covering two swimming periods and two turning periods.

Figure 7A:
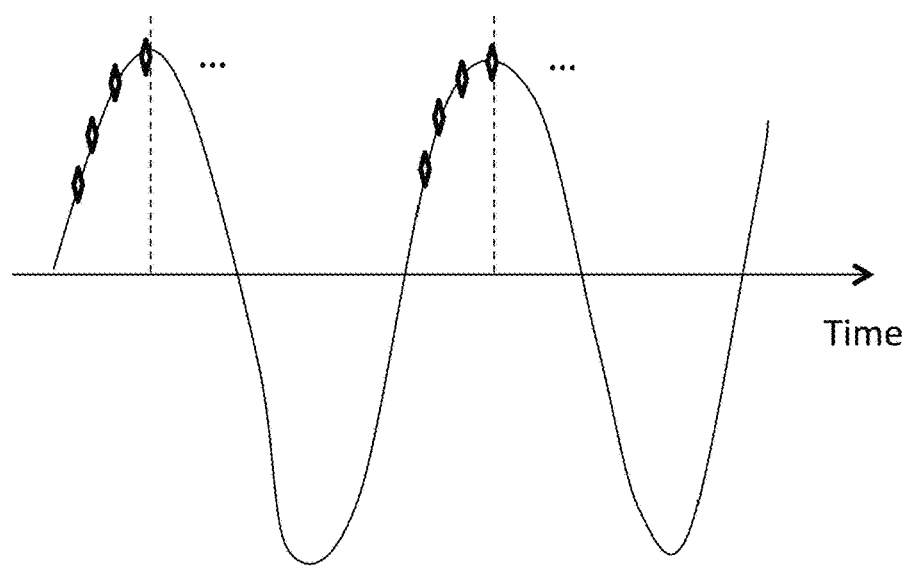
FIG. 7a shows a schematic graph illustrating calculation of correlation factor from accelerometer or magnetometer data.

FIG. 7 shows a graph of one-dimensional acceleration (or it could as well be magnetometric) data over two strokes detected. Peak amplitudes are at the locations of the dashed lines. The acceleration values are determined at constant intervals for each of the peaks (at locations of the "diamond"-marks). Each value of the latter peak is multiplied with the corresponding value at the preceding peak. Then all resulting values are summed to obtain a correlation factor relevant for the latter peak and the dimension concerned. A total correlation factor for this peak is obtained by summing the respective correlation factors for each three dimensions. If the motions that the two peaks represent are similar to each other, a high value is obtained. If they are different by nature, a low value is obtained.

FIG. 8 shows the total correlation factor vs. time over a swimming performance of eighteen pool lengths. Each swimming period is shown as a high-correlation peak because of the periodic correlating strokes as described above. Local minima of the data are calculated to obtain turning period candidates and a threshold value determined for distinguishing between real swimming periods and turning periods. A threshold line has been set to value 1000 and low-correlation periods below that are interpreted to be turns. There are two local minima that do not go beyond the threshold line and are therefore not classified as turns. Alternatively to using the threshold, some another criteria, such as time elapsed from previous real turn, can be used to distinguish between real turns from false candidates. At the end of the performance, there is longer period of very low correlation, which is due to a temporary stoppage and rest of the swimmer at one end of the pool. After that, two more pool lengths are detected.

Figure 9A:
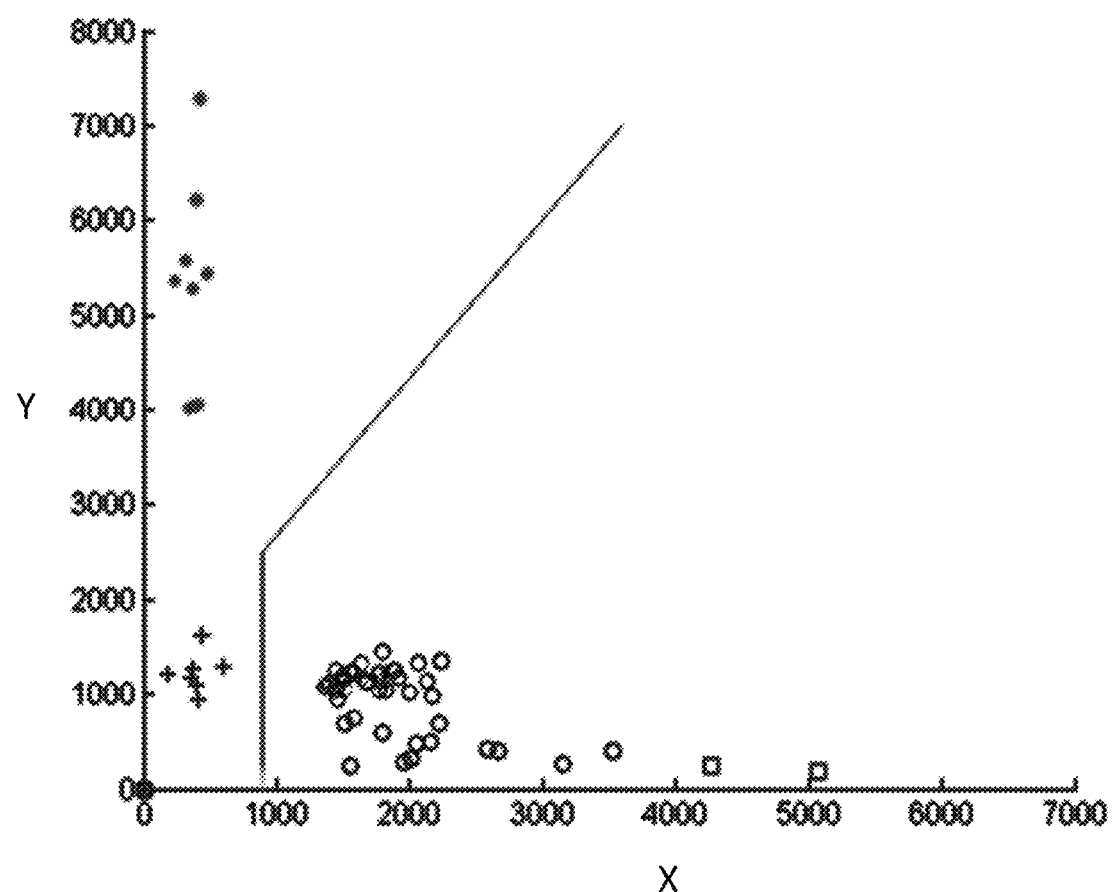
FIGS. 9a and 9b show dimension-specific correlation factors in X-Y and Y-Z graphs, respectively, calculated over each pool length detected for illustrating style determination.
Figure 9B:
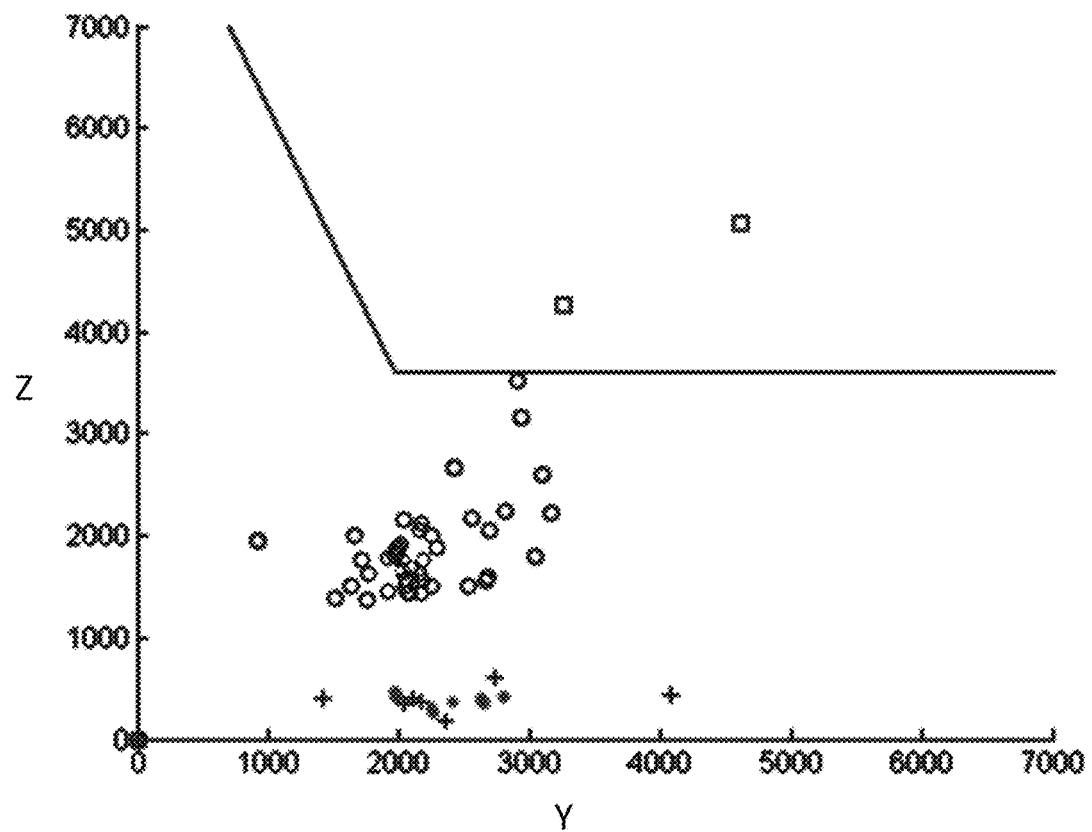

FIGS. 9a and 9b show correlation factors in three dimensions (as X-Y and Y-Z graphs) averaged over each pool length (each circle represent one pool length) such that four different swimming styles were used (first style: stars; second style: crosses; third style: circles; fourth style: boxes). As can be seen, the styles can be well distinguished from each other using the resend method and suitably positioned planes in the three-dimensional space, for example as drawn to FIGS. 9a and 9b can be used to distinguish between styles using simple mathematical comparisons.

Swimming style may also be determined over some other period than a pool length. According to one embodiment, the device comprises a style teaching mode, in which the user may teach the device to more accurately distinguish his/her swimming styles from each other. This is done by measuring and storing representative correlation data values for each swimming style and comparing these with corresponding correlation data values obtained during training. For example, in the teaching mode, the user can select a style through user interface and swim a distance using that style. The device calculates an average correlation vector over the distance swum and store that as a representative correlation vector for that style. When determining swimming styles afterwards during real training, the correlation vector(s) obtained are compared with the representative correlation vector.

The swimming monitor preferably comprises a visual user interface which is adapted to present selected data to the user, such as all or some of the total parameters or (dynamic) interval parameters referred to above. Importantly, there may total training data and/or interval data shown and/or there may be a separate resting time timer whose value is increased, selectively after resetting, every time a resting period is detected. Interval data may be shown by various ways, including individual interval time (resets at each new resting period), summed interval time (resets at the beginning of training and is paused during resting periods), or summed interval and resting time (resets at the beginning of training but is not paused during resting periods). The different ways of presenting data serve for different training needs. For example, there may be a training session with fixed length resting periods, whereby the swimmer can see the resting time running as a separate feature on the display and the interval time as a separate feature. On the other hand, there may be another type of training session with fixed interval time, whereby all excess time can be used for resting. In this case, the swimmer can see total interval plus resting time and knows when to start a new interval. In all cases, the timer(s) act dynamically without preliminary data on the intended course of training or user intervention.

The present invention is most advantageous for analyzing indoor swimming, because there are clear turns at the ends of the pool. However, the invention can naturally also be used in outdoor swimming to detect resting periods or turns at buoys, for example. Swimming style determination is applicable in both environments.

Example and Variations

Indoor Swimming Monitor

Sensors

Exemplary swimming algorithm uses data from an accelerometer and a magnetometer. Data is logged at 10 Hz rate from all axes. Thus there are 6 data streams: acc-x-axis, acc-y-axis, acc-z-axis, mag-x-axis, mag-y-axis and mag-z-axis.

Filtering

Both mag- and acc-data are filtered with low pass and high pass filter.

Stroke Detection

Strokes are detected from filtered magnetometer x, y and z data. Strokes can be detected also from accelerometer data, but magnetometer data gives less errors with the same algorithm.

Stroke detection algorithm searches peaks from all axes of sensor data. Axis with largest peak is selected as main axis. If some other axis later has peak that is bigger than last peak of main axis times a coefficient (value between 1.2-2.2), then this axis is selected as new main axis. The coefficient grows with 0.2 every time peak is accepted as suggested stroke making it more difficult to change main axis. Effect of this growing coefficient is seen in FIG. 5. FIG. 5 shows filtered magnetometer data. Blue crosses are suggested strokes. Third, fourth and fifth stroke do not have highest peak in main axis, but because of the growing coefficient, the main axis is not changed and those peaks are still selected as stroke points.

Peaks of the main axis that fulfill magnitude and time rules are selected as suggested strokes. Magnitude rule may be for example that peak must be more than 33% from previous peak. Time rule may be that peak must come after 50% time has passed from previously accepted peak to peak interval.

Calculate Correlation

Aim of correlation calculation is to detect cyclic motion of arm and changes in that cyclic motion. Advantage of correlation is more robust detection of swimming turns at the pool end and when user changes style. In both cases the arm may continue to move with same or different frequency, but since the path of the arm movement changes thus changing sensor signals, then the correlation will fall and we can detect more accurately changes in cyclic motion. Correlation can be calculated from both magnetometer and accelerometer data. To save processor power consumption, it is preferred to calculate it only from accelerometer data.

Figure 7B:
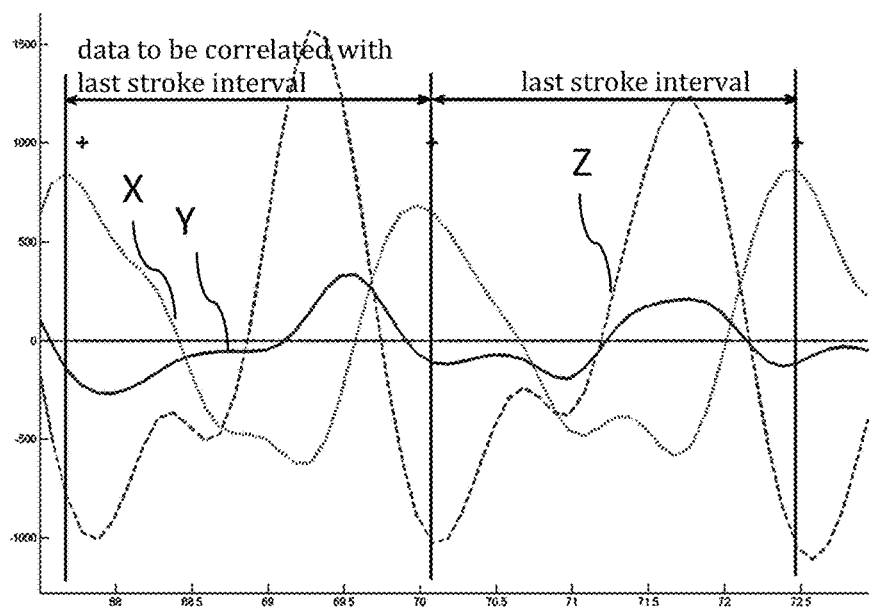
FIG. 7b shows a real-life example of filtered three-axis accelerometer data covering two strokes and illustrating correlation factor calculation.

When peak is detected in any of the magnetometer axes, then correlation of filtered acceleration signal is calculated for each axis data. The correlation calculation length may be tied to previous stroke intervals to save processor power. This means that correlation of acceleration data is calculated between last stroke interval and equal time before that last stroke interval. Example of acceleration data and last stroke interval is shown in FIG. 7b. Correlation data from x, y, and z axes are summed to get only one total correlation value.

Figure 8A:
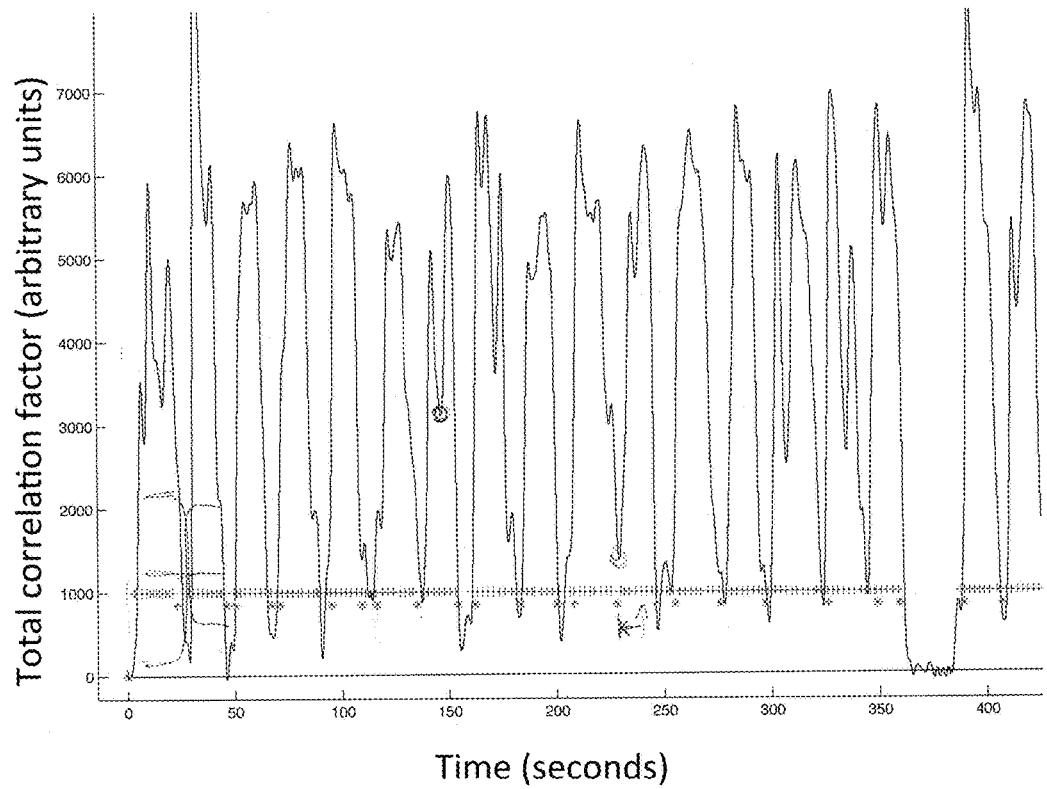
FIG. 8a shows a graph of calculated total correlation factor vs. time for illustrating turn detection.
Figure 8B:
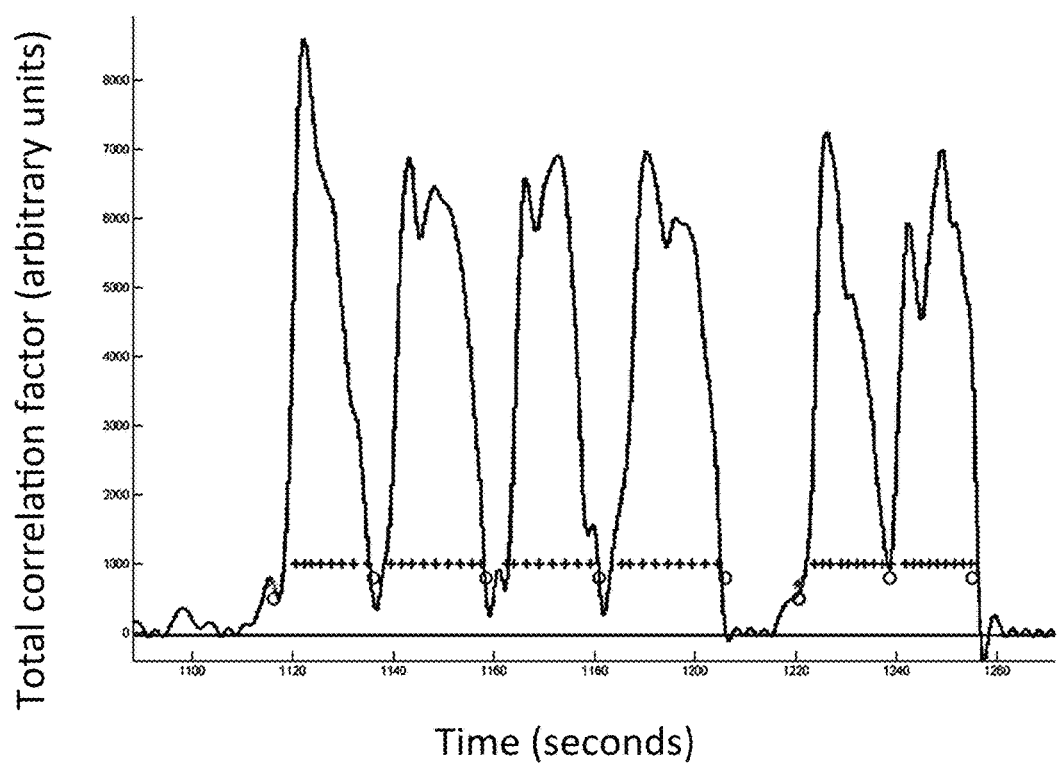
FIG. 8b shows a more detailed graph illustrating total correlation factor over a couple of pool lengths.

FIG. 8b shows how this summed correlation value behaves. It is big when user swims or makes other cyclic motion. It falls sharply when user turns at the end of the pool and when user is not making cyclic motion. Advantage of this is that style of the turn does not affect the turn detection. Only thing that matters is that turn breaks the cyclic motion.

Figure 8C:
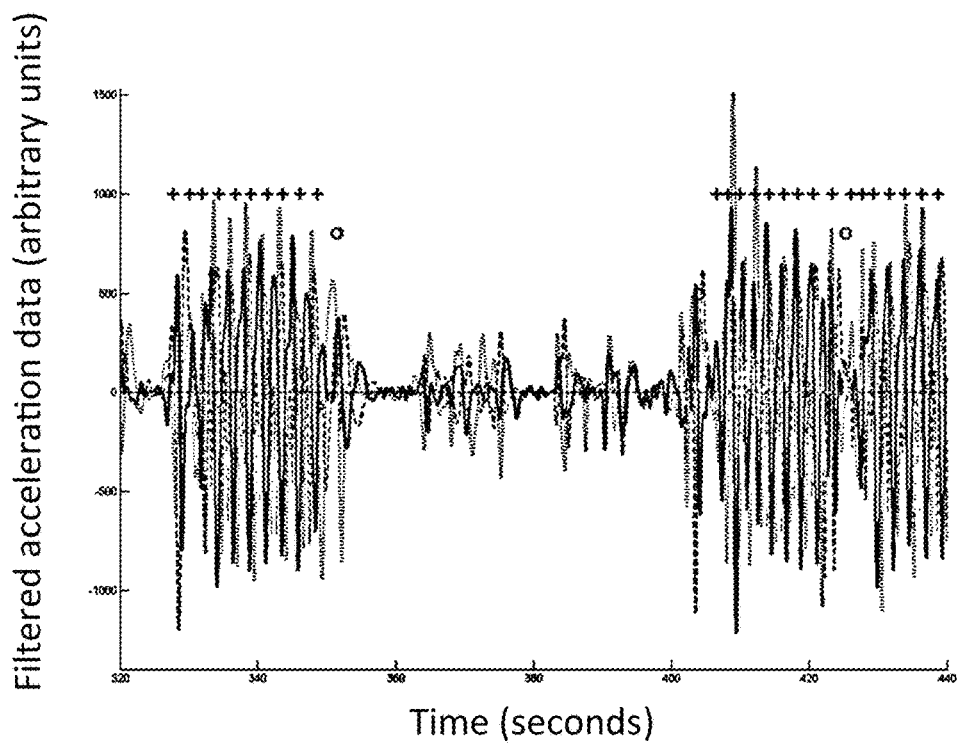
FIG. 8c shows filtered three axis acceleration data used for calculating the total correlation data of FIG. 8d.
Figure 8D:
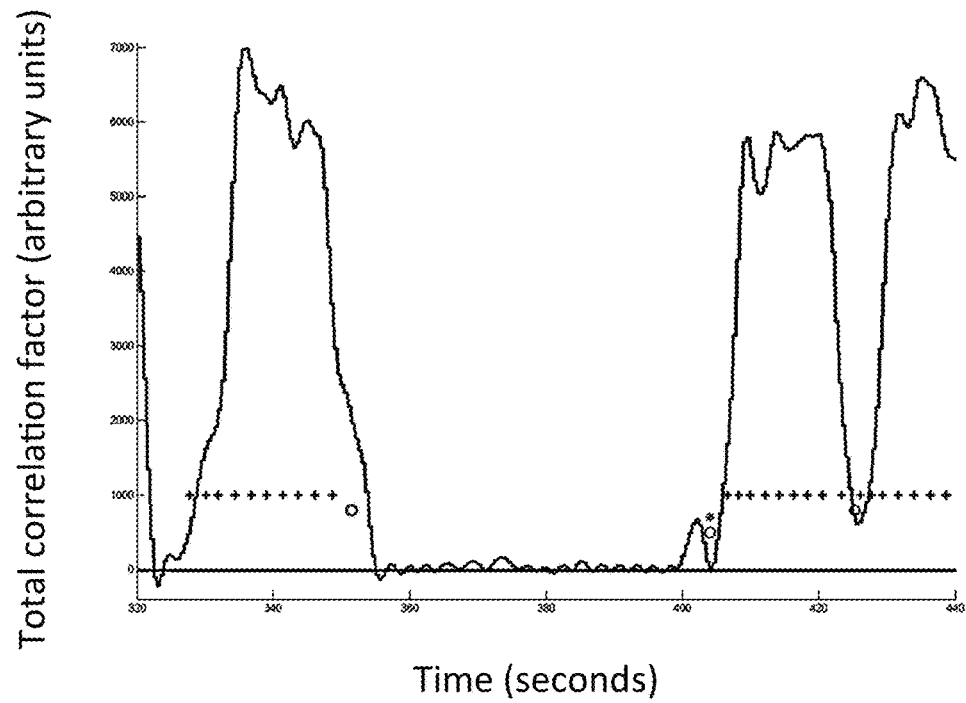
FIG. 8d shows the total correlation factor calculated from the data of FIG. 8c.

FIG. 8c shows that even though hand moves during time period from 360 to 400 seconds, the correlation shown in FIG. 8d does not raise much during that time since the motion is not cyclic. In addition to clear detection of rest period, it is seen clearly that the turn at the end of the pool from correlation data close to the time 426 seconds. Therefore, the advantage of correlation calculation is that the separation of cyclic motion, user doing some other activity than swimming, turns and style change identification is very robust.

Swimming Activity State

Swimming activity state is decided based on the total correlation as described above.

Detecting Pool Lengths

Start of the pool swimming and turns at the ends of the pool are detected based on the total correlation as described above.

Resting Time

Resting time after each swimming interval is determined based on the total correlation as described above.

Detecting Swimming Style

Correlation value for each accelerometer axis varies depending on the style. Therefore correlation values for each axis can be used to create correlation vector for swimming style detection. After the correlation vector has been formed, number of different techniques can be used to classify the swimming style. For example, in predefined styles mode, simple classification tree with piecewise linear boundary rules to decide on the swimming styles.

FIG. 9a shows classification vectors from one swim from X and Y axis perspective. In addition, associated rule boundary lines used in the decision tree are shown. FIG. 9b shows correlation vectors from one swim from Y and Z axis perspective. In FIGS. 9a and 9b, stars represent back stroke, crosses breast stroke, rings free stroke and squares butterfly style. To improve swimming style classification, the correlation vector can be extended to include also other parameters like relative positions of x, y, and z axis acceleration peaks in time axis. Also other parameters derived from sensor data can be used.

Teaching Swimming Style

User can teach his swimming style to algorithm for better style detection. In this mode, device calculates the same correlation vector as in predefined styles mode described above. Style vectors representing user-specified swimming styles are stored in the memory of the device in a teaching mode. Classification in a training mode is done calculating which of the taught style vectors is closest to the correlation vector from last pool length.

CITATION LIST

Patent Literature

US 2004/0020856
U.S. Pat. No. 6,955,542
U.S. Pat. No. 7,980,998
US 2010/0210975

The invention claimed is:

1. A device attachable to a body part of a swimmer for monitoring a swimming performance, the device comprising
one or more motion-sensitive sensors for providing motion data characteristic of the motion of the swimmer during the swimming performance;
a computing unit adapted to detect body motions from the motion data using predefined criteria, wherein the computing unit being configured to calculate a plurality of correlation factors depicting correlation of motion data between successive body motions detected; and
a memory unit storing the correlation factors as a time series;
the computing unit being configured to determine one or more parameters characteristic of the swimming performance based on the correlation factors stored, wherein the motion data comprises data for three different dimensions of motion, the computing unit is adapted to determine a swimming style used in the swimming performance as the parameter characteristic of the swimming performance by determining regions of high overall correlation in the time series of correlation factors, determining dimension-specific correlation factors during the regions of high overall correlation, and classifying the swimming style to one of at least three of predefined swimming style classes based on the values of the dimension-specific correlation factors, and wherein the computing unit is adapted to determine a plurality of turning periods in the swimming performance by identifying regions of low correlation in the time series of correlation factors, to multiply one or more first motion data values at predefined points of detected body motion by one or more second motion data values at corresponding points of a previous detected body motion, and optionally to sum the resulting values over the body motions to obtain a correlation factor depicting correlation between the two body motions.

2. The device according to claim 1, wherein the device is attachable to a wrist of the swimmer and the computing unit is adapted to detect at least hand strokes of the user as the body motions.

3. The device according to claim 1, wherein the computing unit is adapted to determine the number and/or temporal points of the swimmer's turns in a swimming pool as the parameter characteristic of the swimming performance based on regions of temporal variations in the correlation factors in the time series.

4. The device according to claim 3, wherein the computing unit is adapted to analyze the time series of correlation factors so as to find its local minima, and register the local minima as swimmer's turns and/or store the time points of the local minima as temporal points of the swimmer's turns provided that predefined criteria regarding the minima are fulfilled.

5. The device according to claim 3, wherein the computing units is adapted to calculate the total distance of a swim based on the number and/or temporal points of the swimmer's turns and a predefined information on the length of the swimming pool.

6. The device according to claim 1, wherein the computing unit is adapted to determine the resting time of the swimmer during the performance as the parameter characteristic of the swimming performance based on regions of temporal variations in the correlation factors in the time series.

7. The device according to claim 1, wherein the computing unit is adapted to distinguish between swimming periods, turning periods and resting periods using only the measurement data from the one or more motion-sensitive sensors and the correlation factors without user-input data on the course of the performance.

8. The device according to claim 1, further including a user interface configured to display at least two of the following parameters for the user from the one or more parameters characteristic of the swimming performance: swimming time, lap time, inter-lap resting time, total resting time, swimming and resting total time and swimming style.

9. The device according to claim 1, wherein the dimension-specific correlation factors are adapted to be determined as average correlation factors over the regions of high overall correlation.

10. The device according to claim 1, wherein the classifying is adapted to be made by comparing the dimension-specific correlation factors with predefined threshold values in three dimensions or by finding a closest predefined swimming style correlation factor for the dimension-specific correlation factors.

11. The device according to claim 1, wherein comprising a first motion-sensitive sensor, and a second motion-sensitive sensor of different type than the first motion-sensitive sensor, and wherein the computing unit is adapted to use motion data provided by the first sensor for detecting the body motions and motion data provided by the second sensor for calculating the correlation factors.

12. The device according to claim 1, wherein the one or more motion-sensitive sensors comprise a three-dimensional magnetometer.

13. The device according to claim 12, wherein the computing unit is adapted to detect the body motions using motion data provided by the three-dimensional magnetometer.

14. The device according to claim 1, wherein the one or more motion-sensitive sensors comprise a three-dimensional accelerometer, and wherein the computing unit is adapted to determine the correlation factors using motion data provided by the three-dimensional accelerometer.

15. The device according to claim 1, wherein the computing unit is adapted, in a swimming style teaching mode, to measure and store representative correlation data value from more than one dimensions of motion, assign a user-defined swimming style to each representative correlation data value stored, and in a training mode to compare measured correlation data values with stored representative correlation data value in order to distinguish between swimming styles of the swimmer.

16. The device according to claim 1, wherein the one or more swimming parameters characteristic of the swimming performance comprise one or more of the following: stroke count, lap time, SWOLF, average speed, swimming style, resting time.

17. The device according to claim 16, further including a user interface for displaying at least one of the one or more parameters characteristic of the swimming performance.

18. The device of claim 1, wherein the at least three predefined swimming style classes include freestyle, backstroke and breaststroke.

19. The device of claim 1, further including a user interface configured to display at least one of a total number of swimming strokes in the swimming performance, and the number of swimming strokes per lap of the swimming performance.

20. A device attachable to a body part of a swimmer for monitoring a swimming performance, the device comprising:
 one or more motion-sensitive sensors for providing motion data characteristic of the motion of the swimmer during the swimming performance;
 a computing unit adapted to detect body motions from the motion data using predefined criteria, wherein the computing unit being configured to calculate a plurality of correlation factors depicting correlation of motion data between successive body motions detected;
 a memory unit storing the correlation factors as a time series;
 a user interface configured to display at least two of: an inter-lap rest time, a swim time and a total rest plus swim time of the swimming performance; and
 the computing unit being configured to determine one or more parameters characteristic of the swimming performance based on the correlation factors stored, wherein the motion data comprises data for three different dimensions of motion, and the computing unit is adapted to: determine a swimming style used in the swimming performance as the parameter characteristic of the swimming performance by determining regions of high overall correlation in the time series of correlation factors, determining dimension-specific correlation factors during the regions of high overall correlation, and classifying the swimming style to one of at least three of predefined swimming style classes based on the values of the dimension-specific correlation factors, and wherein the computing unit is adapted to: determine a plurality of turning periods in the swimming performance by identifying regions of low correlation in the time series of correlation factors, to multiply one or more first motion data values at predefined points of detected body motion by one or more second motion data values at corresponding points of a previous detected body motion, and optionally to sum the resulting values over the body motions to obtain a correlation factor depicting correlation between the two body motions.

21. The device according to claim 20, wherein the device is attachable to a wrist of the swimmer and the computing unit is adapted to detect at least hand strokes of the user as the body motions.

22. The device according to claim 20, wherein the computing unit is adapted to determine the number and/or temporal points of the swimmer's turns in a swimming pool as the parameter characteristic of the swimming performance based on regions of temporal variations in the correlation factors in the time series.

23. The device of claim 20, wherein the at least three predefined swimming style classes include freestyle, backstroke and breaststroke.

\* \* \* \* \*